United States Patent [19]

Banba et al.

[11] Patent Number: 4,803,614
[45] Date of Patent: Feb. 7, 1989

[54] SYSTEM FOR RETRIEVING DISTRIBUTED INFORMATION IN A DATA BASE

[75] Inventors: Fumiyasu Banba, Hadano; Yoshinori Okami, Odawara, both of Japan

[73] Assignee: Hitachi, Ltd., Tokyo, Japan

[21] Appl. No.: 828,342

[22] Filed: Feb. 11, 1986

[30] Foreign Application Priority Data

Feb. 21, 1985 [JP] Japan ................................. 60-33447

[51] Int. Cl.⁴ ...................... G06F 12/00; G06F 12/08; G06F 12/02; G06F 12/10
[52] U.S. Cl. ................................................. 364/200
[58] Field of Search ... 364/900 MS File, 200 MS File, 364/300 MS File; 355/16, 15; 371/10; 365/189; 369/13-15, 18, 24, 29; 358/903, 102

[56] References Cited

U.S. PATENT DOCUMENTS

| | | | |
|---|---|---|---|
| 4,025,901 | 5/1977 | Bachman et al. | 364/200 |
| 4,085,446 | 4/1978 | Nagamura | 364/900 |
| 4,186,438 | 1/1980 | Benson et al. | 364/200 |
| 4,332,014 | 5/1982 | Nakazawa et al. | 364/900 |
| 4,380,776 | 4/1983 | Smith et al. | 358/102 |
| 4,454,575 | 6/1984 | Bushaw et al. | 358/256 |
| 4,490,747 | 12/1984 | Yokoyama | 358/296 |
| 4,491,874 | 1/1985 | Yamamoto | 358/296 |
| 4,542,477 | 9/1985 | Noyori et al. | 364/900 |
| 4,554,631 | 11/1985 | Reddington | 364/300 |

FOREIGN PATENT DOCUMENTS 1437883  5/1976  United Kingdom ................ 364/200

*Primary Examiner*—Raulfe B. Zache
*Assistant Examiner*—Robert B. Harrell
*Attorney, Agent, or Firm*—Antonelli, Terry & Wands

[57] ABSTRACT

A distributed information retrieval system in which the central computer is connected to a plurality of terminal devices and the management information includes a set of retrieval keys kept on the central computer side where the primary retrieval is achieved. The secondary retrieval thereafter is executed on the terminal side to reduce the load imposed on the central computer and to improve the response time for forwarding an answer to the user of the retrieval system.

13 Claims, 7 Drawing Sheets

SYSTEM FOR RETRIEVING DISTRIBUTED INFORMATION IN A DATA BASE

BACKGROUND OF THE INVENTION

The present invention relates to a distributed information retrieval system, for example, to an image file retrieval system in which a central computer is connected to at least one image file retrieval device.

An image file retrieval device has functions for storing documents or the like as image data in an image file, for retrieving desired image data from the image file, and for displaying or printing the retrieved data. For example, in the prior art image file retrieval device as disclosed by the Japanese Patent Unexamined Publication No. 58-158769, control information containing retrieval keys to be subjected to retrieval processing with respect to an image data item is also stored in the image file retrieval device so that a set of related documents are obtained by achieving a retrieval on the basis of the control or management information.

For the function to extract a set of associated documents, common items such as a title and a keyword are included in each document and the common items are recorded as retrieval keys in the control information for the set of associated documents; therefore, such documents can be retrieved by use of the common items. In order to implement this function in an image file retrieval device, the control information necessary for the information retrieval must be configured in a flexible structure. That is, the addition and change to the control information must be easily accomplished, and a great number of control information items are required to be registered.

In a so-called distributed image file retrieval system in which the central computer is connected to a plurality of image file retrieval devices, local image data items are ordinarily stored on the image file retrieval device side, for example, to minimize the response time for forwarding an answer to the user of the retrieval system. However, there remains a problem to be solved, namely, on which one of the central computer and the terminal device should the management information be stored and should the retrieval processing be effected?

The control information related to the image data cannot be easily stored and accumulated in the image file retrieval device because of the following reasons. To enable distributed image data to be retrieved, all the control information must be stored in an image file retrieval device; however, the control information is of a considerably great amount. Even in a system in which only the control information related to local image data contained in an image file retrieval device is stored, namely, only a portion of the control information is stored, the data volume of the control information cannot be reduced to a satisfactory extent if the control information comprises detailed data items.

Moreover, data addition and change take place frequently on the control information as well as on the data format thereof. In the image file retrieval device, however, the flexible control and maintenance cannot be readily achieved in conjunction with such addition and change to the control information.

On the other hand, if the control information is stored on the central computer side to effect the entire retrieval processing by use of the central computer, the problem of the data volume and that of the flexible control and maintenance of the control information can be solved by the high-performance and large-capacity data base of the central computer. However, there still remains a problem for the user of the retrieval system. That is, in a retrieval operation, the user displays appropriate image data and confirms the displayed data to stepwise narrow the retrieval range including the objective data. Consequently, the retrieval processing is first achieved in a wide range covering a large volume of data, and thereafter it is executed in local narrow ranges many times. In a system in which the data retrieval is entirely performed by the central computer, a retrieval processing in a small range is frequently effected by the central computer, and hence an overhead time to be elapsed in the central computer in addition to the time used for the retrieval processing is increased, which prevents the effective use of the central computer. The response time is therefore increased in the retrieval. Moreover, this is also disadvantageous for the load distribution in the retrieval system.

In a distributed image file retrieval system as described above, if the control or management information is stored in the image file retrieval device, the flexibility of the system is deteriorated; and if it is stored in the central computer system, the inconvenience of the long response time is imposed on the user of the retrieval system. These problems also exist in general in a distributed information retrieval system in which the central computer is connected to retrieval terminal devices.

SUMMARY OF THE INVENTION

It is therefore an object of the present invention to store the management information comprising retrieval keys on the central processor side so that the primary retrieval processing is effected by use of retrieval keys on the central computer side, and to transfer the result of the retrieval processing to the terminal device side so that the secondary retrieval is further achieved on the terminal device side, thereby determining the objective retrieval data.

That is, the central computer system includes a first memory for storing a set of data keys, a device for retrieving from the first memory a group of data keys satisfying a given retrieval condition, and a transmitting device for transmitting the group of retrieved data keys to an external device. On the other hand, the terminal device system includes a second memory for storing a set of retrieval data as a file, an input device for inputting a retrieval condition, a transmitting device for transmitting to the central computer a retrieval condition inputted from the input device and for receiving a group of data keys retrieved by and transmitted from the central computer, a third memory for storing the group of data keys received from the central computer, an indicator, responsive to a retrieval expression inputted from the input device, to indicate a secondary retrieval for retrieving a group of data keys from the third memory and for storing the group of data keys retrieved therefrom in the third memory, an extracting device for extracting from the second memory the specified retrieval data, when a specific retrieval data is specified by a retrieval expression indicating the secondary retrieval, and an output device for visually outputting the group of data keys stored in the third memory as a result of the retrieval and the retrieval data extracted from the second memory.

Another object of the present invention is to store the management information including retrieval keys in the central computer system so that a retrieval processing is entirely effected on the central computer side, and to transmit a key to specify an objective retrieval data to a terminal device so that the objective retrieval data is extracted from a memory on the terminal device side.

That is, the central computer system comprises a first memory for storing a set of data keys, a retrieved device for retrieving from the first memory a data key satisfying a given retrieval condition, and a transmitter for transmitting the retrieved data key to an external device. The terminal device side, on the other hand, includes a second memory for storing a set of retrieval data as a file, an input device for inputting a retrieval condition, a transmitter for transmitting to the central computer the retrieval condition inputted from the input device and for receiving a data key retrieved by and transmitted from the central computer, an extracting device for extracting from the second memory a retrieval data specified by the data key, and an output device for visually outputting the retrieval data extracted from the second memory.

Still another object of the present invention is to enable a terminal device, when an objective retrieval data does not exist in the terminal device, to request and obtain the retrieval data from the central computer.

In other words, when a specified retrieval data is missing in the second memory, the send/receive device of the terminal device transmits an instruction to the central computer to request the retrieval data. The central computer in turn retrieves the requested retrieval data from another second memory and transmits the retrieved data to the terminal device, which then receives and outputs the retrieved data to the output device for visually outputting the data.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1:
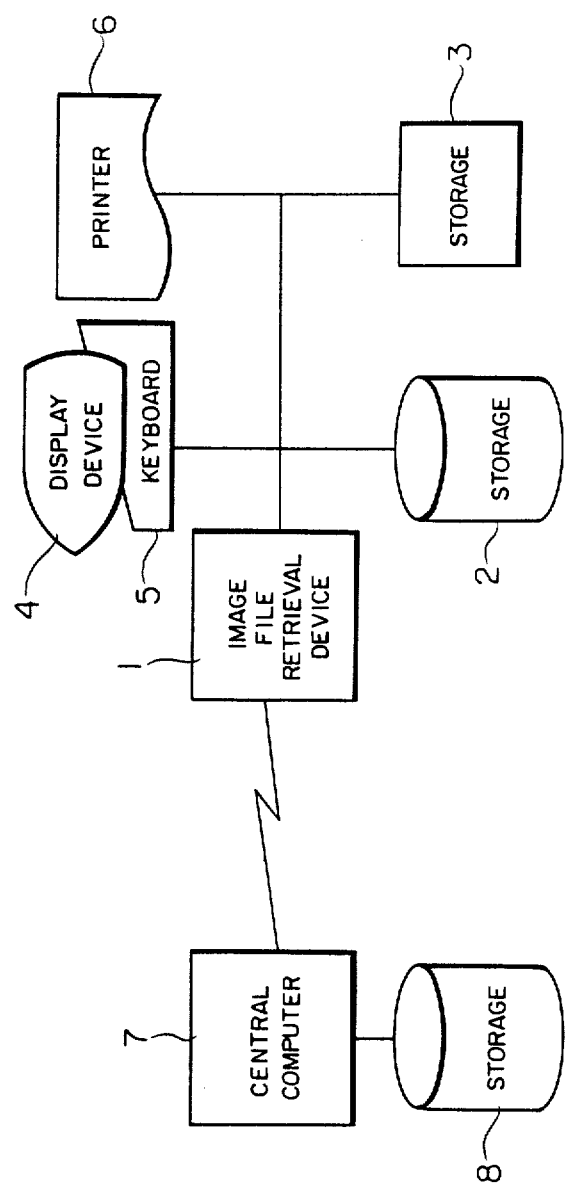
FIG. 1 is a schematic diagram illustrating an overall configuration of an image file retrieval system of an embodiment according to the present invention.

FIG. 1 is a schematic diagram illustrating an overall configuration of an embodiment of an image file retrieval system according to the present invention. An image file retrieval device (or a retrieval terminal device) 1 has a function to retrieve an image file from a storage device 2 and to output a desired image data to a display device 4 and a printer 6. The storage 2 comprises a magnetic disk unit or the like and stores an image file containing image data such as documents. A storage device 3 is a random access memory (RAM) comprising a semiconductor memory or the like and is used to store a retrieval result list transmitted from a central computer 7 and programs and data to be described in the following paragraphs. The display device 4 and a keyboard unit 5 each are used by the user of the retrieval system to instruct a retrieval processing. The central computer 7 is connected to the image file retrieval device 1 via a transmission path such as a communication line and has a storage device 8 in which control or mangement information for managing image data is stored. The storage 8 also comprises a magnetic disk unit or the like. Although, one unit of the image file retrieval device 1 is connected to the central computer, the number of the image file retrieval devices is not limited to one.

Figure 2:
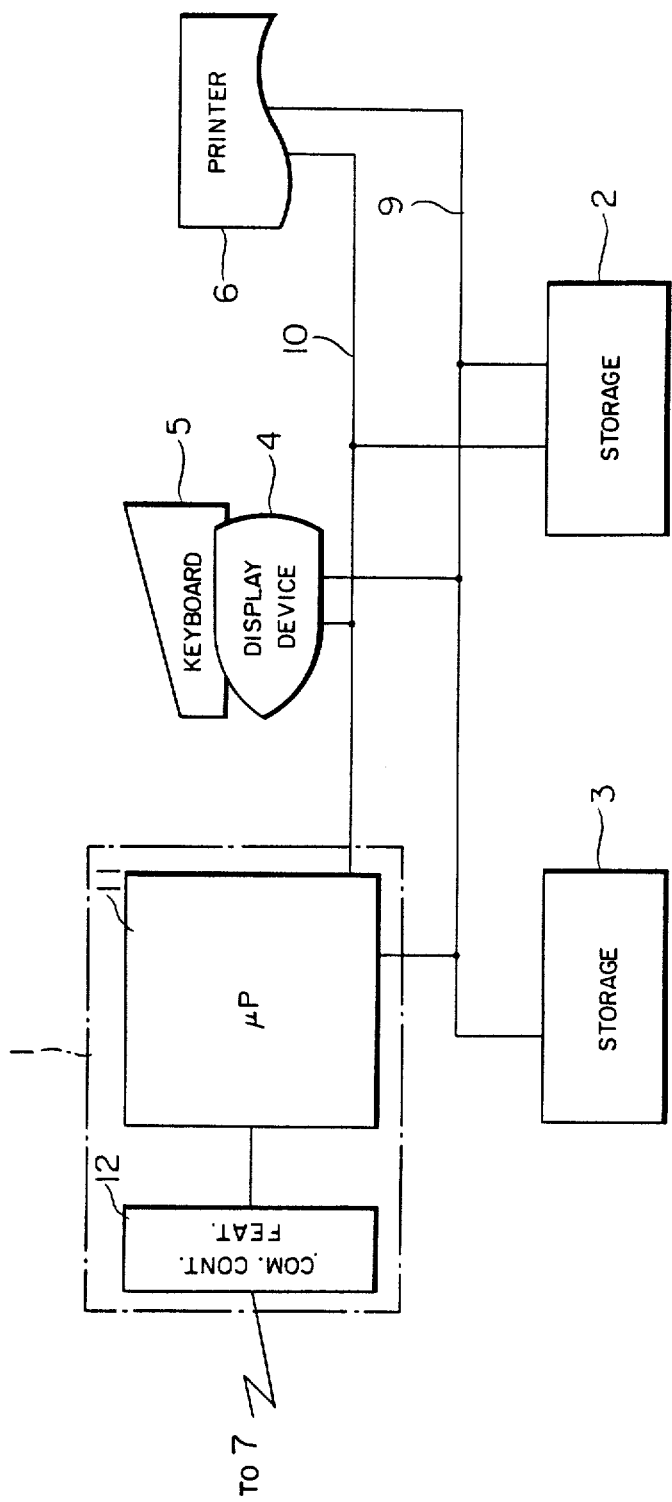
FIG. 2 is a configuration diagram depicting the detailed configuration of a retrieval terminal device in the retrieval system of FIG. 1.

FIG. 2 is a configuration diagram showing further in detail the retrieval terminal device. An image file retrieval device 1 comprises a computer 11 and a communications control feature 12. The computer 11 is, for example, a microprocessor for controlling the overall retrieval terminal device based on programs stored in a stored device 3. The communications control feature 12 is connected on one side to the computer 11 via a signal line and is connected on another side to the central computer 7 via the transmission path described above. This feature 12 transmits under control of the computer 11 to the central computer 7 transmission data stored in the storage 3 and receives data from the central computer 7 to store the reception data in the storage 3. The storage 2, the display device 4, and the printer 6 are connected via an input/output bus 10 to the computer 11. These devices 2, 4, and 6 each initiate their operations according to a control instruction from the computer 11 and send a control signal notifying a termination of the operation to the computer. Furthermore, the computer 11, the storage 2, the display device 4, and the printer 6 each are connected via a memory bus 9 to the storage 3 so as to communicate data with the computer 11 by use of the storage 3. The keyboard device 5 is connected to the display device 4 and communicates control information with the computer 11 through the display device 4. It further communicates data with the computer 11 through the memory bus 9 and the storage 3. In the following paragraphs, an expression "The keyboard device 5 inputs an instruction, a retrieval expression, and the like" means that the keyboard device 5 inputs these data items via the display device 4 and the memory bus 9 to the storage 3. Moreover, an expression "Data is transferred from the image file retrieval device 1 to the central computer 7" means that the communications control features 12 transmits under control of the computer 11 the transmission data from the storage 3 to the central computer 7 through a transmission path. In addition, an expression "Data is transmitted from the central computer 7 to the image file retrieval device 1" indicates that a reverse operation of the above-mentioned processing, namely, the communication control feature 12 receives under control of the computer 11 the data transmitted from the central computer 7 through the transmission path and stores the received data in the storage 3. Furthermore, an expression "An image file is retrieved" means that a data search operation is effected on the data stored in the storage 2 by use of a key so as to store in the storage 3 the data satisfying the condition associated with the key. A technique of such a key search operation to be conducted between a magnetic disk device and a computer has already been known. Moreover, an expression "Data is outputted to the display device 4 or the printer 6" indicates that the computer 11 generates and stores output data in the storage 3 and activates the display device 4 or the printer 6 via the input/output bus 10 to transfer the output data from the storage 3 to the display device 4 or the printer 6 through the memory bus 9, which in turn displays or prints the data in a predetermined format.

The central computer 7 also comprises a semiconductor memory device like the storage 3 and is controlled by programs stored therein to accomplish data transfer operations with respect to the storage 8 via the memory device. Although omitted in FIG. 1, the central computer 7 performs data communication with the image file retrieval device 1 through its own communication control device. Since these configurations and operations have been commonly known, the details thereabout will not be described. In the following paragraphs, an expression "Data is retrieved" means that the data stored in the storage 8 is searched for, based on a key, to store in the semiconductor memory device the data satisfying the condition given for the key. Furthermore, data communication between the image file retrieval device 1 and the central computer 7 is also executed through its communication control device and the semicondutor memory device.

Figure 3:
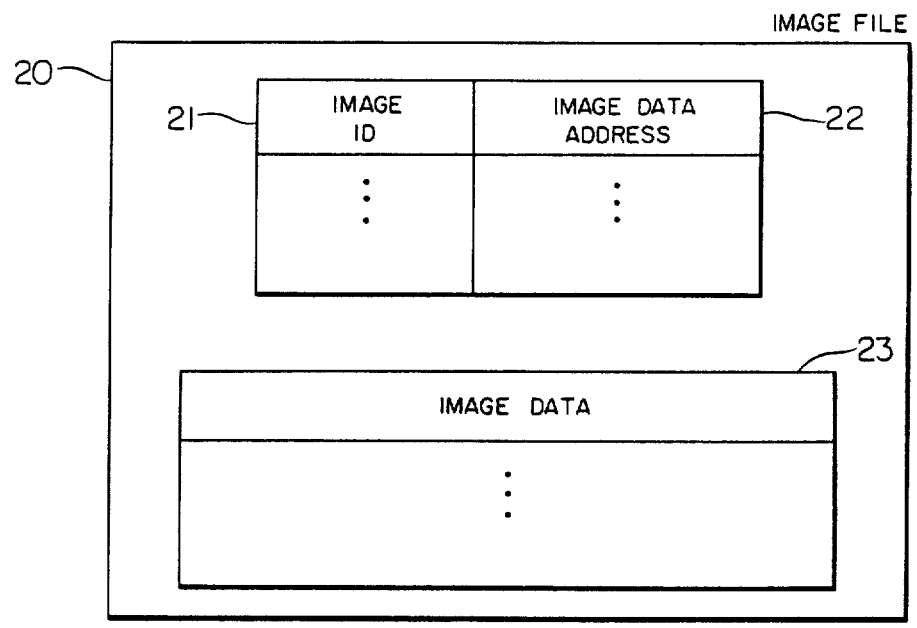
FIG. 3 is a diagram representing a data layout in an image file.

FIG. 3 is a diagram illustrating a configuration of an image file stored in the storage 2 of the image file retrieval device 1. In this diagram, an image file 20 includes image data 23, an image identification (ID) 21 for identifying the image data 23, and an image data address 22 for addressing the image data 23. The image ID 21 contains information unique to the retrieval system, for example, a document number assigned to identify the image data 23 and is used as a key for retrieving an image file. The image file 20 can be created by use of a dedicated image input device or the like; however, since the details about the file creation is not directly related to the present invention, the description thereabout will be omitted.

When an image ID is specified, the image file retrieval device 1 searches for the image ID 21 in the image file 20. If an image ID matching the specified image ID is found, the image file retrieval device 1 reads the image data 23 by use of the associated image data address 22 and outputs the data to the display device 4 or the like.

Figure 4:
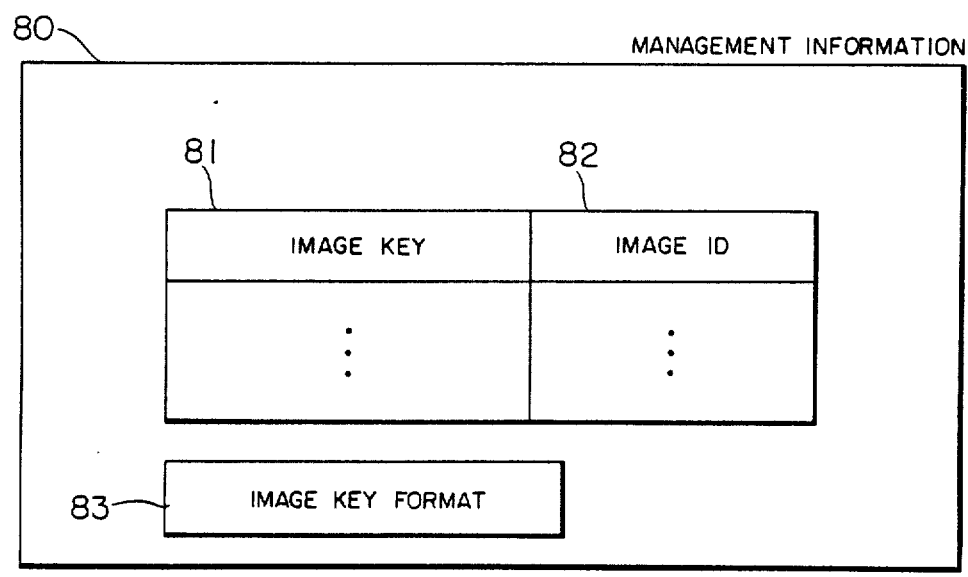
FIG. 4 is a diagram showing a data layout in a management information.

FIG. 4 is a diagram depicting a configuration of management information stored in the storage 8 of the central computer 7. In this diagram, a management information 80 exists for each image file 20 and comprises a pair of an image ID 82 identical to the image ID 21 of FIG. 3 and an image key 81 as an additional information of the image ID 82 and an image key format 83 specifying the format and structure of he image key 81 in detail.

Figure 5A:
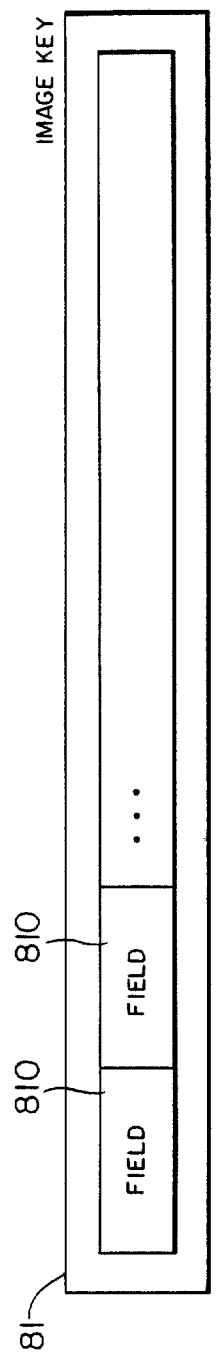
FIG. 5A is a diagram depicting a data layout of an image key.
Figure 5B:
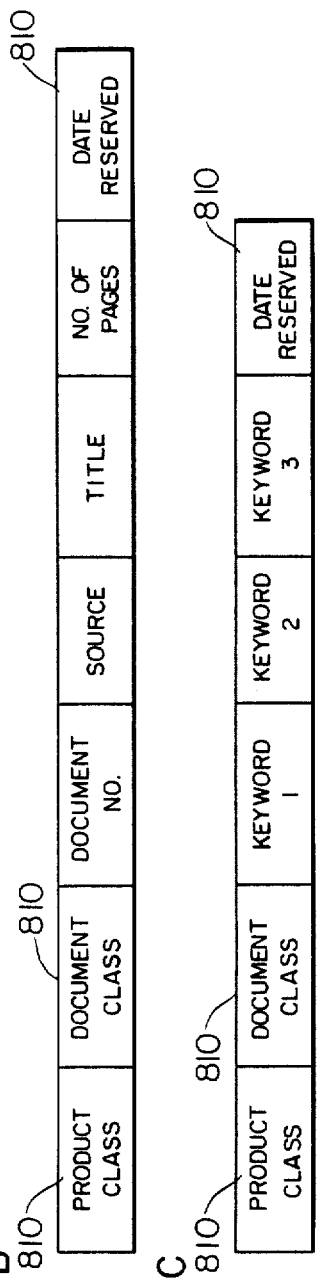
FIG. 5B is a diagram illustrating one example of an image key format.
Figure 5C:
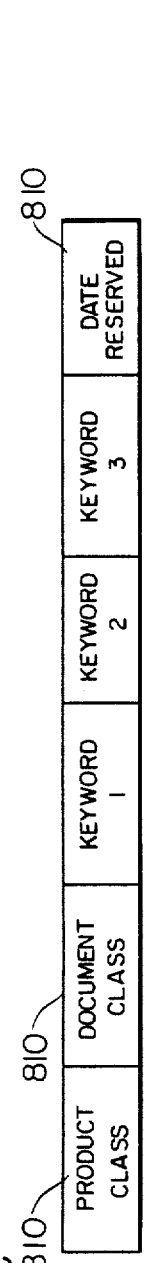
FIG. 5C is a diagram illustrating another example of an image key format.
Figure 5D:
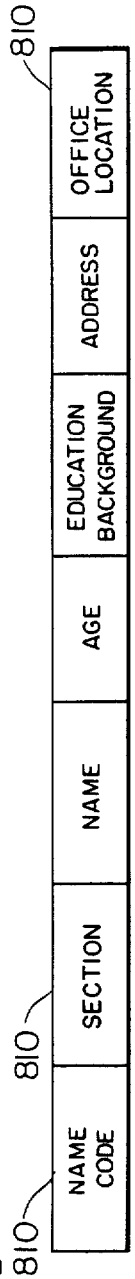
FIG. 5D is a diagram illustrating another example of an image key format.

As shown in FIG. 5A, the image key 81 comprises a plurality of fields 810. Each field 810 contains information characterizing the associated image file 20 and retrieval items for the retrieval processing. FIG. 5B is a diagram illustrating an example of an image key format of a document file in which a plurality of documents are stored. It comprises fields 810 such as those of a code for classifying a product, namely, a product class, a document class code, a document number, a source code (indicating a classification of a newspaper, a magazine, a catalog, a paper, or the like), a title, the number of pages, and a data reserved. FIG. 5C is a diagram depicting an example of an image key format for achieving a document management on the same document file by use of another management information. The fields of the product class, document class, and date reserved are the same as those of FIG. 5B. In this example, however, up to three keywords are assigned to enable a document to be retrieved by such keywords. FIG. 5D is a diagram showing an example of an image key format of a personnel file containing personnel information. In the image key format, fields 810 include data items such as a name code, a section, a name, an age, an education background, a current address, and an office location, respectively.

Figure 6:
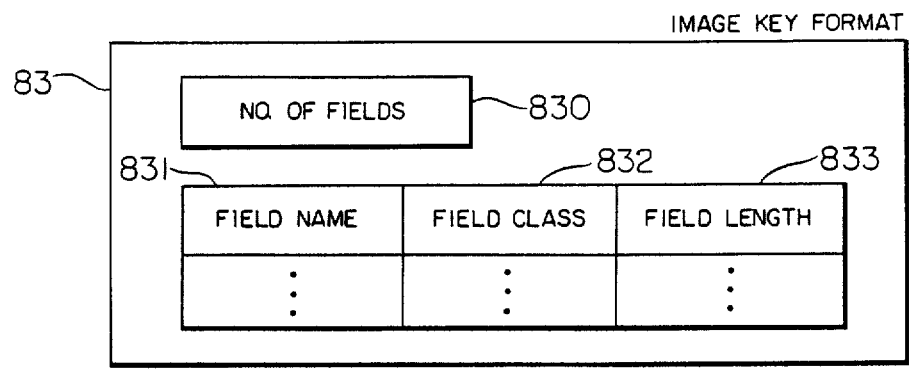
FIG. 6 is a diagram illustrating a data configuration in an image key format.

FIG. 6 is a diagram illustrating a configuration of the image key format 83. The image key format 83 indicates the format of an image key 81 in the management information and includes data items such as the number of fields 830, field name 831, field class 832, and field length 833. The number of fields 830 contains the number of the fields constituting the image key 81. This contains, for example, seven for the image key of the document file shown in FIG. 5B and six for that of the same document file depicted in FIG. 5C. The field name 831 contains a name assigned to the associated field. For example, field names of the image key of the document file are the product class, document type, document number, and so forth in FIG. 5B. The field class 832 indicates the type of the data stored in the field 810, for example, character data, binary data, or the like. The field length 833 indicates the length of the associated field. It may be represented in bytes, for example.

Only one image key format 83 is contained in a management information 80, namely, all image keys 81 in the same management information are of the same data format. However, the number of the management information 80 associated with an image file is not limited to one. As already shown in the examples, the image key formats of FIGS. 5B and 5C are the different management information items for the same image file 20. That is, when a plurality of management information 80 are assigned to an image file 20, the same image file 20 can be retrieved by a plurality of management information 80, thereby implementing a flexible retrieval function in the image file retrieval.

Figure 8:
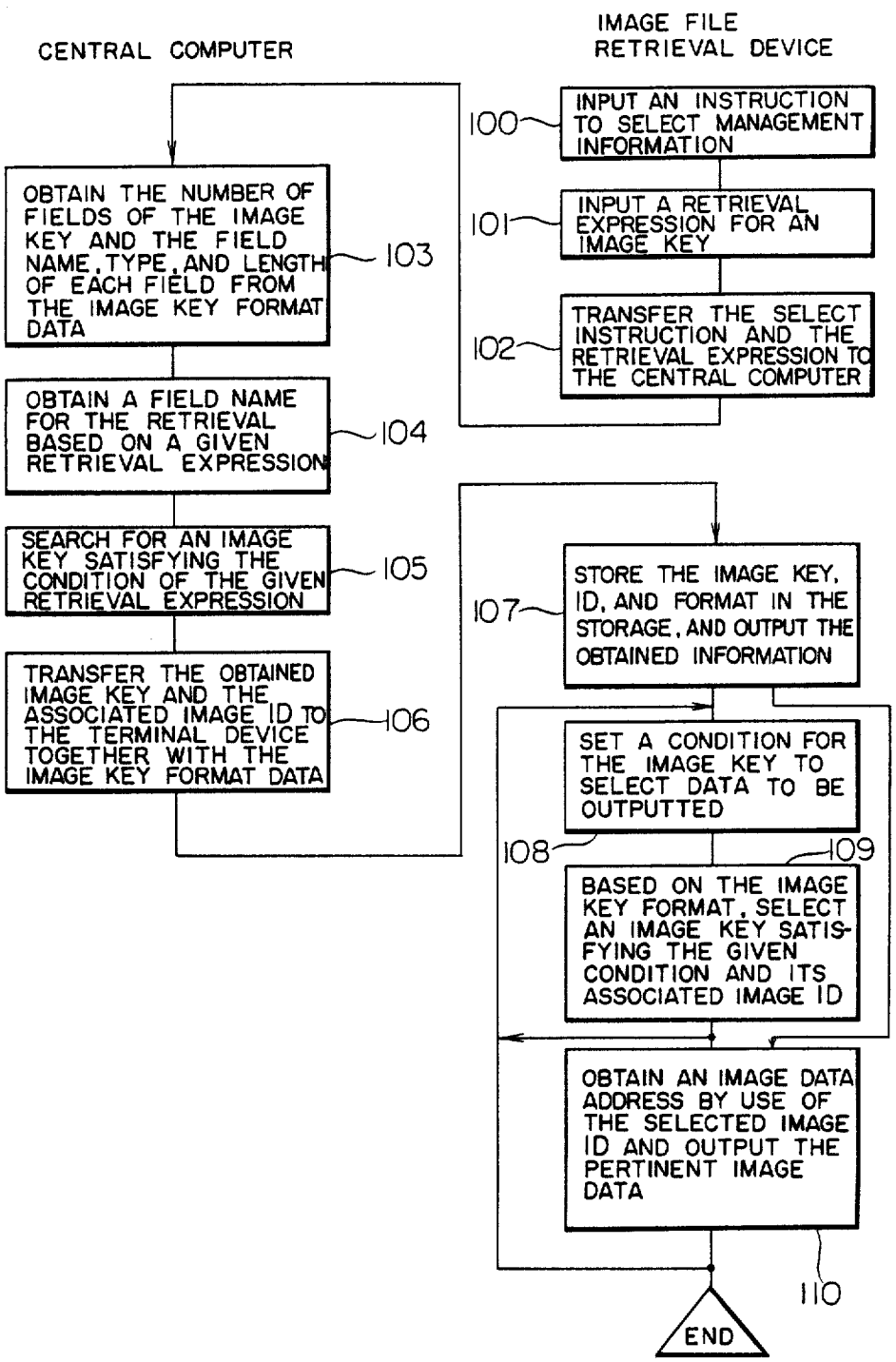
FIG. 8 is a processing flowchart for explaining a procedure of the retrieval processing.

Next, the retrieval operation will be described according to the preferred embodiments. FIG. 8 is a processing flowchart for explaining the retrieval operation. The processing flow is divided into two portions for the central computer and image file retrieval device representing the processing procedures of the programs stored in the central computer 7 and the storage 3, respectively.

First of all, the user of the retrieval system inputs an instruction from the keyboard device 5 for selecting management information 80 related to the image file 20 (step 100). For example, when the document file described above is retrieved by management information having the image key of FIG. 5B, the management information is selected by use of a unique identifier. If only one type of management information 80 is used or if the type is implicitly determined for the management information 80, the select instruction may be omitted. The user than inputs from the keyboard device 5 a retrieval expression necessary for the retrieval of the image file 20 (step 101). The retrieval expression is used by the central computer 7 to execute a retrieval operation based on the image key 81 and is formulated as a conditional expression with respect to field names in the image key 81. For example, if the data reserved <850101 and the document class=03 are specified as a retrieval expression to achieve a document file retrieval by use of a management information including the image key of FIG. 5B, it indicates to select documents having a date reserved preceding 1985 and a document class code of 0.3. The instruction and the retrieval expression inputted from the keyboard device 5 are transferred via the image file retrieval device 1 to the central computer 7 (step 102).

The central processor 7 selects the management information 80 in response to the instruction and obtains from the image key format 83 the number of image key fields in the associated management information 80 and the field name, class, and length of each field (step 103). It then searches for the image keys 81 associated with the field name obtained as a retrieval objective from the retrieval expression, thereby extracting the image keys satisfying the condition of the given retrieval expression (steps 104 and 105). The extracted image keys 81 each are transferred to the image file retrieval device 1 together with the associated ID 82 and image key format 83 (step 106).

Figure 7:
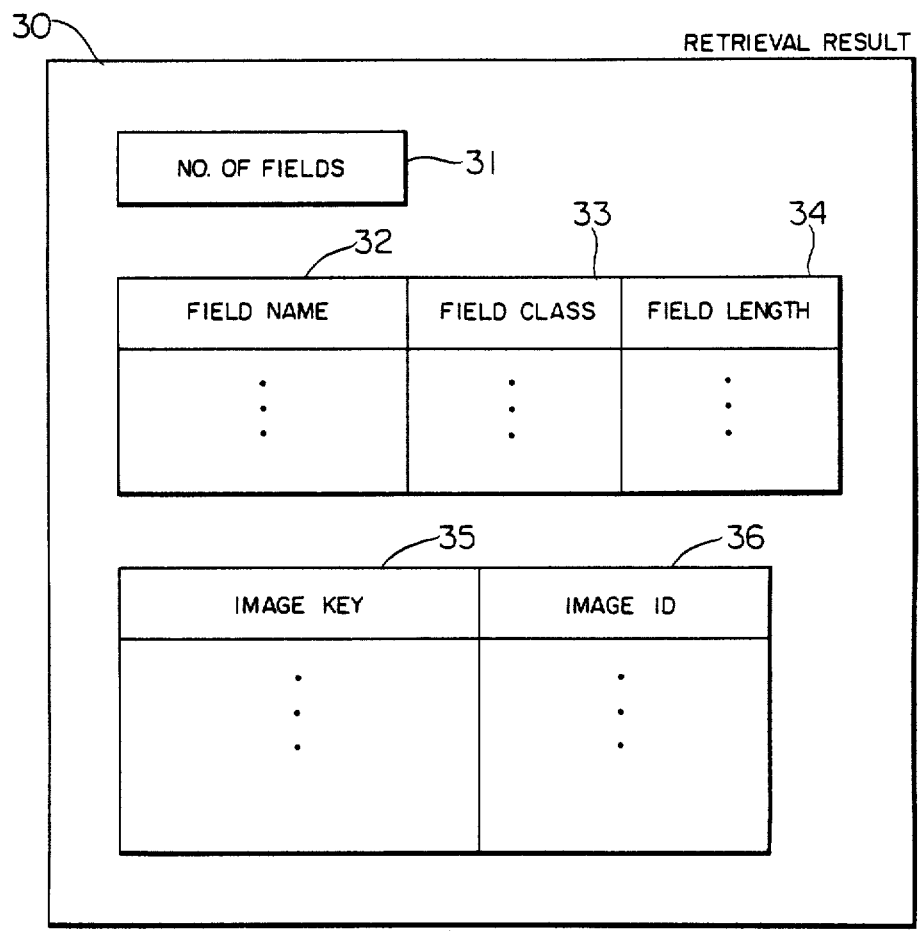
FIG. 7 is a diagram depicting a data configuration of a retrieval result transmitted from the central computer to a retrieval terminal device.

The image file retrieval device 1 receives the retrieval results transmitted from the central computer 7 and stores the received data in the storage 3 (step 107). The retrieval results to be stored in the storage 3 are shown in FIG. 7. That is, the retrieval result 30 comprises a copy of the image key format 83, namely, the number of fields 81, field name 32, field class 33, and field length 34, and a copy of the data related to the image key 81 extracted by the central computer 7, namely, the image key 35 and image ID 36. The retrieval result 30 is thereafter edited, for example, the field names such as the product class and document class are added, and the edited data is displayed in a table format on the display device 4 (step 107).

The user of the retrieval system inputs from the keyboard device 5 a conditional expression to select an image to be outputted in terms of the image key 35 contained in the retrieval result 30 (step 108). In contrast to the primary retrieval, this operation is the secondary retrieval in which the retrieval expression is specified in the same way as for the primary retrieval. In the example for retrieving a document file by use of the image key of FIG. 5B, the primary retrieval is achieved according to the conditional expression comprising date reserved <850101 and document class=03, then the secondary retrieval can be executed by specifying a conditional expression, source code=catalog, for example. The image file retrieval device 1 retrieves the image key 35 by using the copy of image key format stored in the storage 3, thereby determining an image ID corresponding to the image key 35 confirming the specified retrieval expression (step 109). Results of this operation are also displayed in a table format on the display device 4. The user may return to step 108 further to specify items for limiting the retrieval expression. After an image ID 36 associated with the image key 35 is determined in the fashion described above, the same image ID 21 is retrieved from the image file 20 in the storage 2 based on the image ID 36, and the associated image data address 22 is obtained to read the pertinent image data 23, which is then outputted to the display device 4 or the printer 6 (step 110). By repeating steps 108-110 thereafter, the objective data can be sequentially outputted in the range of the retrieval result shown in FIG. 7.

The user may specify a key from the keyboard device 5 to sequentially display or print the image data 23 in the order of image keys 35 obtained as a result of the retrieval. In this case, the image file retrieval device 1 sequentially retrieves the same image ID 21 from the image file 20 based on the image ID 36 corresponding to the image key 35 so as to obtain the image data address 22 and sequentially reads the pertinent image data 23, which is then outputted to the display device 4 or the printer 6 in turn. If the image key has been limited to a satisfactory extent as a result of the primary retrieval, step 110 may be initiated immediately after step 107 to display the pertinent image data 23. In this case, steps 108 and 109 constituting the secondary retrieval processing are skipped.

In another embodiment of the present invention, the image key format is fixed in advance, namely, only one type of image key is used. This prevents the selection of management information and the flexibility of the image data retrieval is deteriorated. However, since the number of management information types is limited to one, the instruction need not be inputted to select the management information; moreover, since only one type of image key configuration is assigned, the retrieval system thus created is quite easy for the user to understand. In the embodiment, the central computer need not transfer the copy of the image key format to the image file retrieval device.

In still another embodiment of the present invention, the image data is distributed to a plurality of image file retrieval devices 1. In this case, if an image file retrieval device 1 requires an image data not contained in an image file 20 thereof, the image file retrieval device 1 requests the central computer 7 to send the image data. The central computer 7 in turn reads the image data from another image file retrieval device and transmits the data to the image file retrieval device 1.

Figure 9:
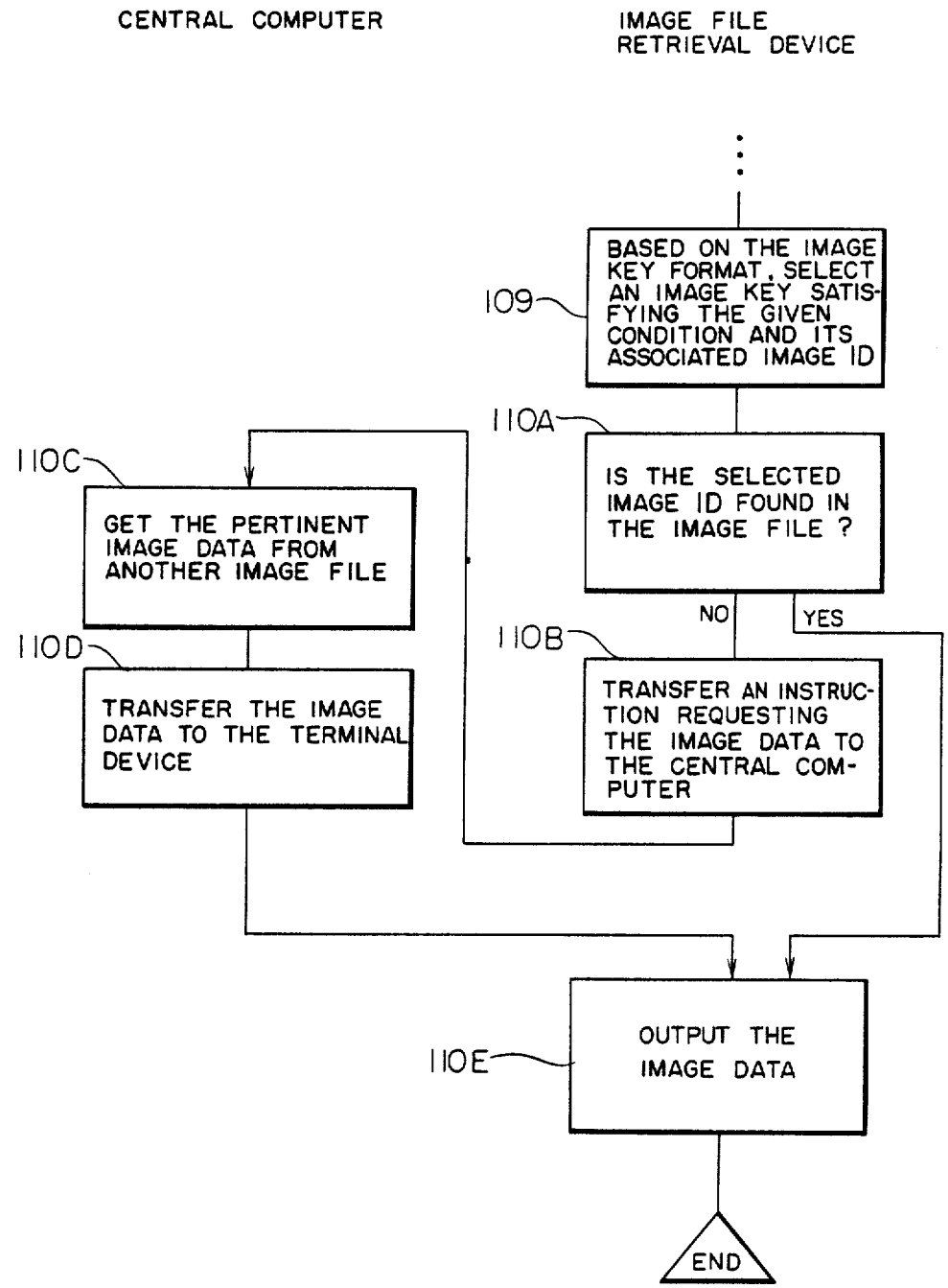
FIG. 9 is a processing flowchart for explaining another procedure of the retrieval processing.

FIG. 9 is a processing flowchart illustrating the processing steps to be executed when a selected image ID is missing in an image file of the pertinent retrieval device. Since the processing associated with steps 100-109 of FIG. 8 is identical, these steps will not be described in conjunction with FIG. 9. In step 110A, the selected image ID is checked whether or not it is found in the specified image file, whereas in step 110B, the image data is requested to the central computer 7 because it is missing in the specified image file. In step 110C, the central computer 7 obtains the image data from another image file or another image file retrieval device, whereas in step 110D, the obtained image data is transferred to the image file retrieval device 1. The image data is then outputted in step 110E. The case in which the specified image data is missing in the image file on the pertinent terminal device side is further classified into two cases as follows. First, although an image file to which the specified image data belongs exists on the terminal device side, the image data to be accessed less frequently or the latest image data is existing not on the terminal side but in the central computer 7 or the like. Secondly, the image file is missing on the terminal side, for example, although an image file retrieval device 1 has a document file to be controlled by the management information shown in FIG. 5B, the personnel file to be controlled by the management information of FIG. 5D is existing not in the image file retrieval device 1 but in another image file retrieval device. As can be seen from the description above, both cases can be processed by the embodiment.

In accordance with the present invention as described above, the image file retrieval device is capable of retrieving an image key by use of the copy of the image key format and image key transmitted from the central computer. As a consequence, this provision allows the central computer to be relieved from the load of such a secondary retrieval. Moreover, if the image data is found in an image file retrieval device on the terminal side, the image data transfer does not occur between the central computer and the image file retrieval device, and hence the response time for sending an answer to the user of the retrieval system is minimized and the transmission path therebetween is less frequently utilized. In addition, the image file retrieval is not fixed as has been the case with the prior art technique, namely, a plurality of management information types can be selected for an image file 20, thereby implementing a flexible data retrieval. Since the detailed management information about the image data is stored in a mass storage device on the central computer side, the storage on the terminal device side is not burdened with such management information. Furthermore, the management information comprising image keys is managed and maintained on the central computer side, which relieves the terminal side from the load of the management and maintenance of the management file.

We claim:

1. An information retrieval system in which a plurality of data keys are assigned respectively to each of a plurality of stored retrieval data for identifying each stored retrieval data and in which a retrieval condition designating a subset of said data keys for retrieving said data keys is inputted to obtain a predetermined stored retrieval data satisfying said retrieval condition, so that the obtained predetermined stored retrieval data is outputted for visual display, comprising:

a central computer including:
(1) first storage means for storing a set of said data keys;
(2) retrieving means, connected to said first storage means, for retrieving from said first storage means a group of data keys satisfying said retrieval condition, in the form of said subset of said data keys; and
(3) transmitting means, connected to said retrieving means, for transmitting the retrieved data keys to a terminal device; and said terminal device including:
(4) second storage means for storing a set of said retrieval data as image files;
(5) input means for inputting said retrieval condition and retrieval expression data;
(6) transceiving means, connected to said input means, for transmitting to said central computer said retrieval condition inputted from said input means and for receiving said group of data keys retrieved by and transmitted from said central computer;
(7) third storage means, connected to said transceiving means, for storing said transmitted group of data keys;
(8) means, connected to said input means, responsive to retrieval expression data inputted from said input means, for providing a secondary retrieval for said group of data keys stored in said third storage means, thereby storing in said third storage means a further group of data keys obtained as a result of said secondary retrieval;
(9) means, connected to said second storage means, for extracting from said second storage means said predetermined retrieval data specified by said retrieval expression on the basis of at least one of said further group of data keys; and
(10) means for outputting said further group of data keys stored in said third storage means and said predetermined retrieval data extracted from said second storage means for visual display.

2. An information retrieval system according to claim 1 wherein said set of data keys stored in said first storage means includes a plurality of groups of data keys, each group being constituted by data keys having a similar format.

3. An information retrieval system according to claim 2 wherein said plurality of groups correspond to the same image file.

4. An information retrieval system according to claim 2 wherein;
said input means inputs an identifier for identifying said group of data keys prior to the input of said retrieval condition,
said transceiving means transmits said identifier to said central computer, and
said means for extracting said group of data keys selects one of said group of data keys based on said identifer.

5. An information retrieval system according to claim 1 wherein said retrieval data stored in said second storage means includes image information.

6. An information retrieval system according to claim 1 wherein:
said transceiving means of said terminal device includes means for transmitting an instruction to said central computer, when said means for extracting said predetermined retrieval data from said second storage means cannot find said predetermined retrieval data in said second storage means, to request said predetermined retrieval data;
said central computer includes means for extracting the requested predetermined retrieval data from a different second storage means and means for transmitting the extracted predetermined retrieval data to said terminal device;
said transceiver means further includes means for receiving the extracted predetermined data; and
said output means of said terminal device outputs the received predetermined retrieval data.

7. An information retrieval system in which a plurality of data keys are assigned respectively to each of a plurality of stored retrieval data for identifying each stored retrieval data and in which a retrieval condition for retrieving said data keys is inputted to obtain a predetermined stored retrieval data satisfying said retrieval condition, so that the obtained retrieval data is outputted for visual display, comprising:
 a central computer including;
 first storage means for storing a set of said data keys,
 retrieving means, connected to said first storage means, for retrieving from said first storage means a data key satisfying said retrieval condition, and
 means, connected to said retrieving means, for transmitting said retrieved data key to a terminal device; and
 said terminal device including;
 second storage means for storing a set of said retrieval data as a image file;
 input means for inputting said retrieval condition;
 transceiving means, connected to said input means, for transmitting to said central computer said retrieval condition inputted from said input means and for receiving said data key retrieved by and transmitted from said central computer;
 means, connected to said second storage means, for extracting from said second storage means said predetermined retrieval data specified by said data key; and
 means for outputting said predetermined retrieval data extracted from said second storage means for visual display.

8. An information retrieval system according to claim 7 wherein said set of data keys stored in said first storage means includes a plurality of groups of data keys, each group constituted by data keys having a similar format.

9. An information retrieval system according to claim 8 wherein a plurality of said groups correspond to the same image file.

10. An information retrieval system according to claim 8 wherein;
 said input means inputs an identifier for identifying said group of data keys prior to the input of said retrieval condition,
 said transceiving means transmits said identifier to said central computer, and
 said means for extracting said group of data keys selects one of said group of data keys based on said identifier.

11. An information retrieval system according to claim 7 wherein said retrieval data stored in said second storage means includes image information.

12. An information retrieval system according to claim 7 wherein:
 said transceiving means of said terminal device includes means for transmitting an instruction to said central computer, when said means for extracting said specified retrieval data from said second storage means cannot find said predetermined retrieval data in said second storage means, to request said predetermined retrieval data;
 said central computer includes means for extracting the requested predetermined retrieval data from a different said second storage means and means for transmitting the extracting predetermined retrieval data to said terminal device;
 said transceiving means further includes means for receiving said extracted predetermined retrieval data; and
 said output means of said terminal device outputs the received predetermined retrieval data.

13. A method for retrieving information in which a plurality of data keys are assigned respectively to each of a plurality of stored retrieval data for identifying the individual retrieval data and in which a retrieval condition designating a subset of said data keys for retrieving said data keys is inputted to obtain stored retrieval data satisfying said retrieval condition so that the obtained retrieval data is outputted for visual display, comprising the steps of:
 transmitting said retrieval condition inputted from an input means on a terminal device side from the terminal device to a central computer;
 extracting a group of data keys satisfying said retrieval condition in the form of said subset of said data keys;
 transmitting the extracted group of data keys to said terminal device by use of the central computer which stores the set of data keys in a first memory;
 storing in a second memory on said terminal device side the group of data keys received by said terminal device;
 outputting the group of data keys stored in said second memory for visual display;
 providing on the terminal device side a retrieval according to a retrieval expression inputted from said input means to achieve a secondary retrieval from the group of data keys;
 storing a result of the secondary retrieval in said second memory, outputting the result to an output means;
 retrieving from a third memory storing the set of retrieval data as a file on the terminal device side the specified retrieval data on the basis of the stored result of the secondary retrieval, when a specific one of the retrieval data is specified by the retrieval expression; and
 outputting the set of retrieved data to said output means.

* * * * *